(12) United States Patent
Kim et al.

(10) Patent No.: US 9,999,054 B2
(45) Date of Patent: Jun. 12, 2018

(54) METHOD AND APPARATUS FOR TRANSMITTING RADIO FRAME INCLUDING CONTROL INFORMATION IN A WLAN SYSTEM

(71) Applicant: LG ELECTRONICS INC., Seoul (KR)

(72) Inventors: Jeongki Kim, Seoul (KR); Kiseon Ryu, Seoul (KR); Wookbong Lee, Seoul (KR); Jinsoo Choi, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 114 days.

(21) Appl. No.: 15/060,457

(22) Filed: Mar. 3, 2016

(65) Prior Publication Data

US 2016/0262157 A1 Sep. 8, 2016

Related U.S. Application Data

(60) Provisional application No. 62/127,846, filed on Mar. 4, 2015.

(51) Int. Cl.
*H04W 72/04* (2009.01)
*H04B 7/0413* (2017.01)
(Continued)

(52) U.S. Cl.
CPC ...... *H04W 72/0453* (2013.01); *H04B 7/0413* (2013.01); *H04L 1/0057* (2013.01);
(Continued)

(58) Field of Classification Search
CPC ............. H04W 72/0453; H04W 48/12; H04W 72/042; H04W 84/12; H04B 7/0413;
(Continued)

(56) References Cited

U.S. PATENT DOCUMENTS

2010/0260159 A1* 10/2010 Zhang ................... H04W 28/06
370/338
2011/0064040 A1* 3/2011 Kim ....................... H04L 1/0631
370/329
(Continued)

FOREIGN PATENT DOCUMENTS

WO 2011108832 9/2011
WO 2012057546 5/2012
(Continued)

OTHER PUBLICATIONS

PCT International Application No. PCT/KR2016/002139, Written Opinion of the International Searching Authority dated Jul. 11, 2016, 11 pages.
(Continued)

*Primary Examiner* — Hashim Bhatti
(74) *Attorney, Agent, or Firm* — Lee, Hong, Degerman, Kang & Waimey

(57) ABSTRACT

A method and apparatus for transmitting a multi-user or multi-Station (multi-STA) radio frame including control information in a Wireless Local Area Network (WLAN) system are disclosed. The method includes generating a frame including a signaling field and a data field, and transmitting the generated frame to the plurality of STAs. The signaling field includes a first signaling field (a SIG A field) including control information for frame interpretation and a second signaling field (a SIG B field) including control information individually for each of the plurality of STAs, the second signaling field includes a first block including common control information for the plurality of STAs, and a second block including control information for each of the plurality of STAs.

10 Claims, 22 Drawing Sheets

(51) Int. Cl.
   *H04L 1/00* (2006.01)
   *H04L 5/00* (2006.01)
   *H04L 29/08* (2006.01)
   *H04W 48/12* (2009.01)
   *H04W 84/12* (2009.01)

(52) U.S. Cl.
   CPC .......... *H04L 5/0007* (2013.01); *H04L 69/323* (2013.01); *H04W 48/12* (2013.01); *H04W 72/042* (2013.01); *H04L 5/003* (2013.01); *H04W 84/12* (2013.01)

(58) Field of Classification Search
   CPC ... H04L 5/0007; H04L 1/0057; H04L 69/323; H04L 5/003
   See application file for complete search history.

(56) References Cited

U.S. PATENT DOCUMENTS

| | | | |
|---|---|---|---|
| 2014/0119327 A1 | 5/2014 | Oh et al. | |
| 2014/0126509 A1 | 5/2014 | You | |
| 2014/0307612 A1* | 10/2014 | Vermani | H04L 5/0044 370/312 |
| 2014/0307650 A1* | 10/2014 | Vermani | H04L 5/0044 370/329 |
| 2015/0016558 A1 | 1/2015 | Choi et al. | |
| 2016/0112851 A1* | 4/2016 | Li | H04L 69/18 370/338 |
| 2016/0255610 A1* | 9/2016 | Li | H04B 7/0413 370/329 |
| 2017/0093478 A1* | 3/2017 | Yu | H04B 7/0684 |
| 2017/0126293 A1* | 5/2017 | Chen | H04B 7/0452 |
| 2017/0223734 A1* | 8/2017 | Lin | H04W 74/04 370/392 |

FOREIGN PATENT DOCUMENTS

| | | |
|---|---|---|
| WO | 2016004351 | 1/2016 |
| WO | 2016029874 | 3/2016 |

OTHER PUBLICATIONS

European Patent Office Application Serial No. 16158698.7, Search Report dated Jul. 28, 2016, 8 pages.

* cited by examiner

| | B0 B1 | B2 | B3 | B4 B9 | B10 B12 | B13 B15 | B16 B18 | B19 B21 | B22 | B23 |
|---|---|---|---|---|---|---|---|---|---|---|
| Composite Name: | BW | Reserved | STBC | Group ID | NSTS/Partial AID | | | | TXOP_PS_NOT_ALLOWED | Reserved |
| SU Name: | BW | Reserved | STBC | Group ID | SU NSTS | Partial AID | | | TXOP_PS_NOT_ALLOWED | Reserved |
| MU Name: | BW | Reserved | STBC | Group ID | MU[0] NSTS | MU[1] NSTS | MU[2] NSTS | MU[3] NSTS | TXOP_PS_NOT_ALLOWED | Reserved |
| Bits: | 2 | 1 | 1 | 6 | 3 | 3 | 3 | 3 | 1 | 1 |

| | B0 | B1 | B2 | B3 | B4 | B5 | B6 | B7 | B8 | B9 | B10 B17 | B18 B23 |
|---|---|---|---|---|---|---|---|---|---|---|---|---|
| Composite Name: | Short GI | Short GI NSYM Disambiguation | SU/MU[0] Coding | LDPC Extra OFDM symbol | SU VHT-MCS/MU[1-3] Coding | | | | Beam-formed | Reserved | CRC | Tail |
| SU Name: | Short GI | Short GI NSYM Disambiguation | SU/MU[0] Coding | LDPC Extra OFDM symbol | SU VHT-MCS | | | | Beam-formed | Reserved | CRC | Tail |
| MU Name: | Short GI | Short GI NSYM Disambiguation | SU/MU[0] Coding | LDPC Extra OFDM symbol | MU[1] Coding | MU[2] Coding | MU[3] Coding | Reserved | Reserved | Reserved | CRC | Tail |
| Bits: | 1 | 1 | 1 | 1 | 1 | 1 | 1 | 1 | 1 | 1 | 8 | 6 |

FIG. 14

| Octets: | 2 | 2 | 6 | 6 | 6 | 2 | 6 | 2 | 4 | 0-11426 | 4 |
|---|---|---|---|---|---|---|---|---|---|---|---|
| | Frame Control | Duration /ID | Address 1 | Address 2 | Address 3 | Sequence Control | Address 4 | QoS Control | HT Control | Frame Body | FCS |

MAC header

FIG. 15

| VHT =0 | Link Adaptation Control | Calibration Position | Calibration Sequence | Reserved | CSI/Steering | NDP Announcement | Reserved | AC Constraint | RDG/More PPDU |
|---|---|---|---|---|---|---|---|---|---|
| Bits: 1 | 15 | 2 | 2 | 2 | 2 | 1 | 5 | 1 | 1 |

B1 / B15 — B16 B17 — B18 B19 — B20 B21 — B22 B23 — B24 — B25 B29 — B30 — B31

(a)

| TRQ | MAI | MFSI | MFB/ASELC |
|---|---|---|---|
| 1 | 4 | 3 | 7 |

| | B1 | B2 | B3 B5 | B6 B8 | B9 B23 | B24 B26 | B27 | B28 | B29 | B30 | B31 |
|---|---|---|---|---|---|---|---|---|---|---|---|
| | VHT=1 | Reserved | MRQ | MSI | MFSI/ GID-L | MFB | GID-H | Coding Type | FB Tx Type | Unsoli cited MFB | AC Constraint | RDG/ More PPDU |
| Bits: | 1 | 1 | 1 | 3 | 3 | 15 | 3 | 1 | 1 | 1 | 1 | 1 |

(a)

| B9 B11 | B12 B15 | B16 B17 | B16 B23 |
|---|---|---|---|
| VHT N_STS | MCS | BW | SNR |
| 3 | 4 | 2 | 6 |

| | Frame Control | A1 | A2 | Sequence Control | A3 | A4 | Frame Body | FCS |
|---|---|---|---|---|---|---|---|---|
| Octets: | 2 | 2 or 6 | 6 or 2 | 0 or 2 | 0 or 6 | 0 or 6 | variable | 4 |

(a)

| | B0 B1 | B2 B4 | B5 B7 | B8 | B9 | B10 | B11 | B12 | B13 | B14 | B15 |
|---|---|---|---|---|---|---|---|---|---|---|---|
| | Protocol Version | Type | PTID/ Subtype | From DS | More Fragm ents | Power Manage ments | More Data | Protected Frame | End of Service Period | Relayed Frame | Ack Policy |
| Bits: | 2 | 3 | 3 | 1 | 1 | 1 | 1 | 1 | 1 | 1 | 1 |

(b)

METHOD AND APPARATUS FOR TRANSMITTING RADIO FRAME INCLUDING CONTROL INFORMATION IN A WLAN SYSTEM

Pursuant to 35 U.S.C. § 119(e), this application claims the benefit of U.S. Provisional Patent Application No. 62/127,846, filed on Mar. 4, 2015, the contents of which is hereby incorporated by reference herein in its entirety.

BACKGROUND OF THE INVENTION

Field of the Invention

The present invention relates to a method and apparatus for transmitting a multi-user or multi-Station (multi-STA) radio frame including control information in a Wireless Local Area Network (WLAN) system.

Discussion of the Related Art

Standards for WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

SUMMARY OF THE INVENTION

In IEEE 802.11ax, Orthogonal Frequency Division Multiple Access (OFDMA) and Multiple User (MU) transmission schemes are adopted. Accordingly, there is a need for a method for efficiently allocating resources for transmission of a frame to multiple users or reception of frames from the multiple users, at a time point.

Further, a radio frame including various pieces of control information for a plurality of users should be transmitted in an IEEE 802.11ax system. Therefore, a method and apparatus for efficiently transmitting such a radio frame need to be considered.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting a radio frame to a plurality of Stations (STAs) in a Wireless Local Area Network (WLAN) system includes generating a frame including a signaling field and a data field, and transmitting the generated frame to the plurality of STAs. The signaling field includes a first signaling field (a SIG A field) including control information for frame interpretation and a second signaling field (a SIG B field) including control information individually for each of the plurality of STAs, the second signaling field includes a first block including common control information for the plurality of STAs, and a second block including control information for each of the plurality of STAs.

The second signaling field may include one first block and one or more second blocks following the first block, and the number of second blocks may be determined according to the number of the plurality of STAs.

The first block may include resource allocation information for the plurality of STAs as common control information for the plurality of STAs.

The resource allocation information may include at least one of information about the number of resource allocation units to be allocated, information about the size of each resource allocation unit, information about frequency-domain arrangement of each resource allocation unit, and information about the number of users allocated per resource allocation unit.

The second signaling field may include control information independently encoded per 20-MHz band.

The second signaling field may be transmitted repeatedly on a 40-MHz basis in an 80-MHz band, and control information may be encoded independently in each 20-MHz band of specific 40 MHz.

The first block and the second block of the second signaling field may be encoded individually on a block basis.

Each of the first block and the second block of the second signaling field may include an individual Cyclic Redundancy Check (CRC).

The first signaling field may include information about a resource area in which the second signaling field is transmitted.

In another aspect of the present invention, a wireless apparatus for transmitting a radio frame to a plurality of STAs in a WLAN system includes a processor configured to generate a frame including a signaling field and a data field, and a transceiver configured to transmit the generated frame to the plurality of STAs. The signaling field includes a first signaling field (a SIG A field) including control information for frame interpretation and a second signaling field (a SIG B field) including control information individually for each of the plurality of STAs, the second signaling field includes a first block including common control information for the plurality of STAs, and a second block including control information for each of the plurality of STAs.

The second signaling field may include one first block and one or more second blocks following the first block, and the number of second blocks may be determined according to the number of the plurality of STAs.

The first block may include resource allocation information for the plurality of STAs as common control information for the plurality of STAs.

The resource allocation information may include at least one of information about the number of resource allocation units to be allocated, information about the size of each resource allocation unit, information about frequency-domain arrangement of each resource allocation unit, and information about the number of users allocated per resource allocation unit.

The processor may independently encode control information of the second signaling field in each 20-MHz band.

The processor may individually encode the first block and the second block of the second signaling field on a block basis.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 9 to 13 illustrate exemplary frame structures used in an Institute of Electrical and Electronics Engineers (IEEE) 802.11 system;

FIGS. 14, 15, and 16 illustrate a Medium Access Control (MAC) frame format;

FIG. 17 illustrates a short MAC frame format;

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the invention.

As described before, the following description is given of a method and apparatus for efficiently using a wideband channel in a Wireless Local Area Network (WLAN) system. For this purpose, a WLAN system to which the present invention is applied will first be described.

Figure 1:
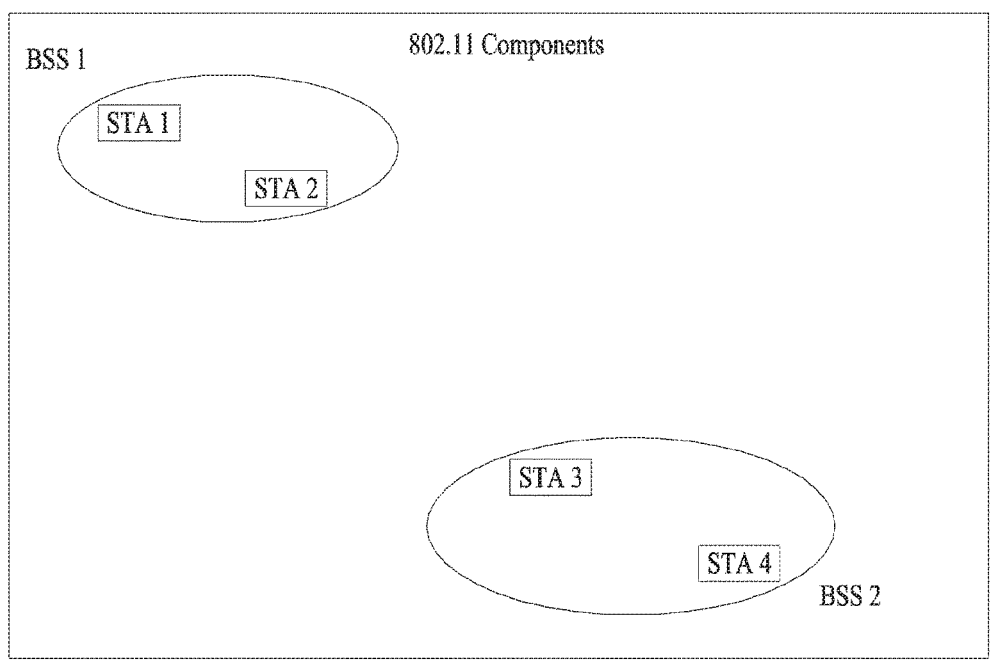
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBS 5).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
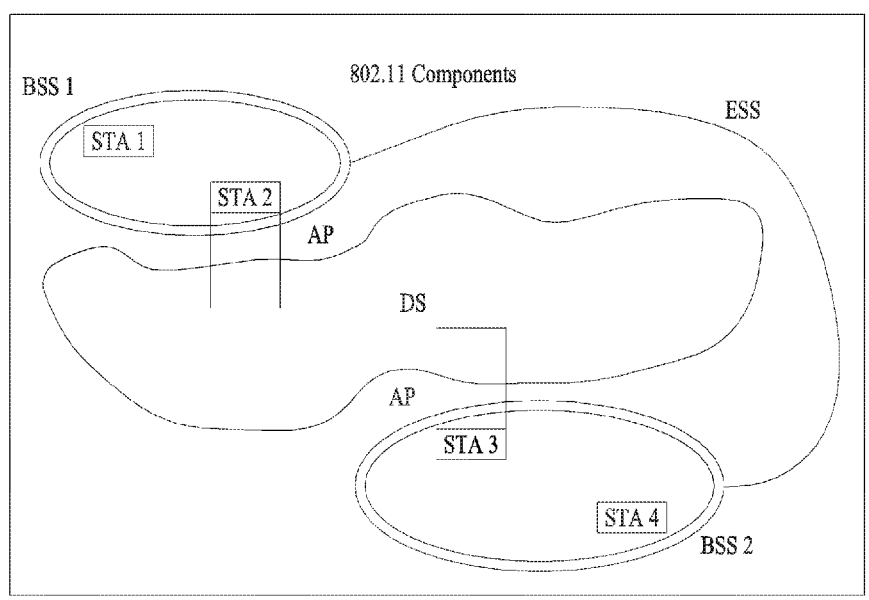
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Figure 3:
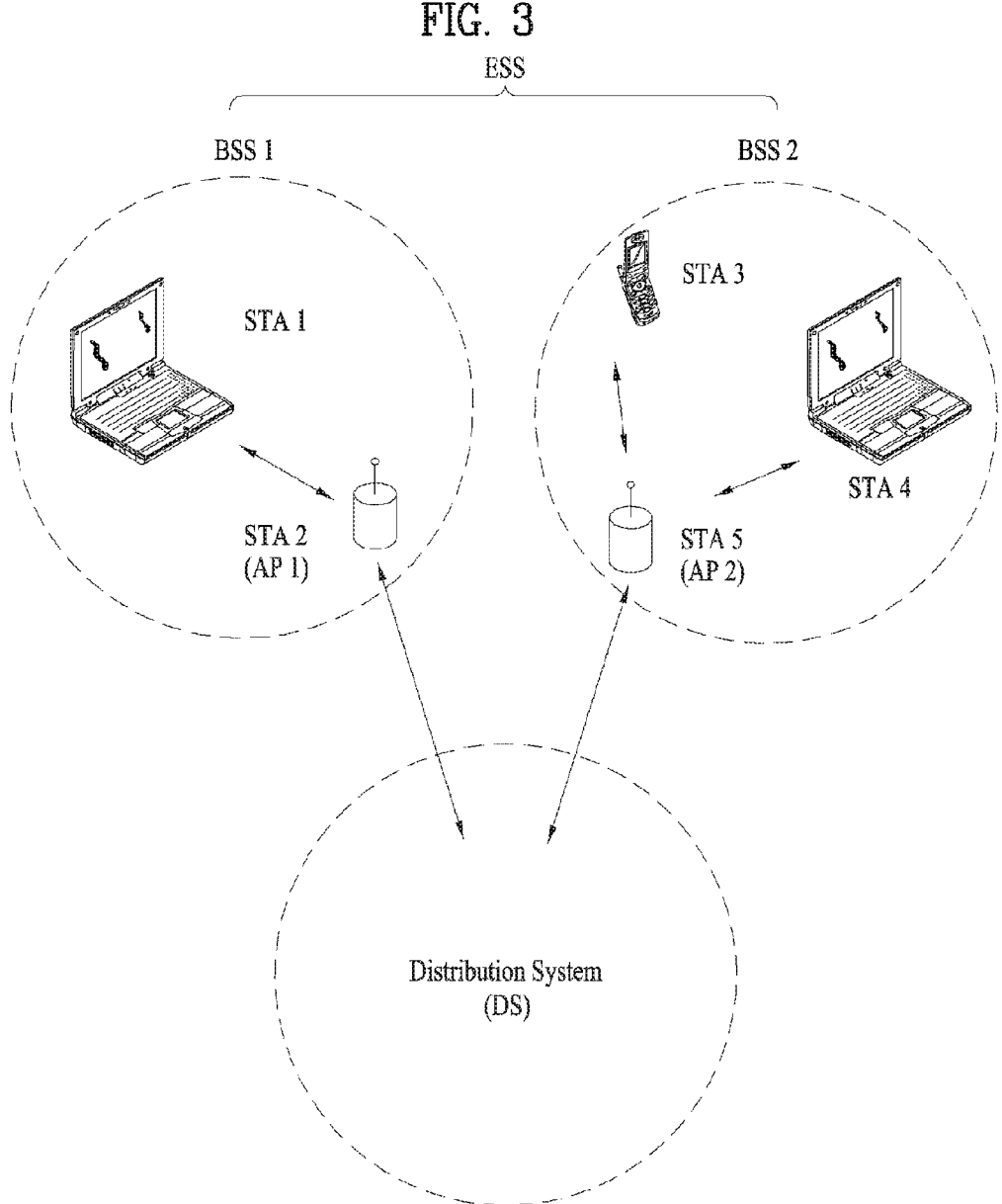
FIG. 3 illustrates an exemplary configuration of a Wireless Local Area Network (WLAN) system.

FIG. 3 illustrates an exemplary configuration of a WLAN system. In FIG. 3, an exemplary infrastructure BSS including a DS is illustrated.

In the example of FIG. 3, an ESS includes BSS1 and BSS2. In the WLAN system, an STA is a device complying with Medium Access Control/Physical (MAC/PHY) regulations of Institute of Electrical and Electronics Engineers (IEEE) 802.11. STAs are categorized into AP STAs and non-AP STAs. The non-AP STAs are devices handled directly by users, such as laptop computers and mobile phones. In FIG. 3, STA1, STA3, and STA4 are non-AP STAs, whereas STA2 and STA5 are AP STAs.

In the following description, a non-AP STA may be referred to as a terminal, a Wireless Transmit/Receive Unit (WTRU), a User Equipment (UE), a Mobile Station (MS), a Mobile Terminal (MT), or a Mobile Subscriber Station (MSS). An AP corresponds to a Base Station (BS), a Node B, an evolved Node B (eNB), a Base Transceiver System (BTS), or a femto BS in other wireless communication fields.

Figure 4:
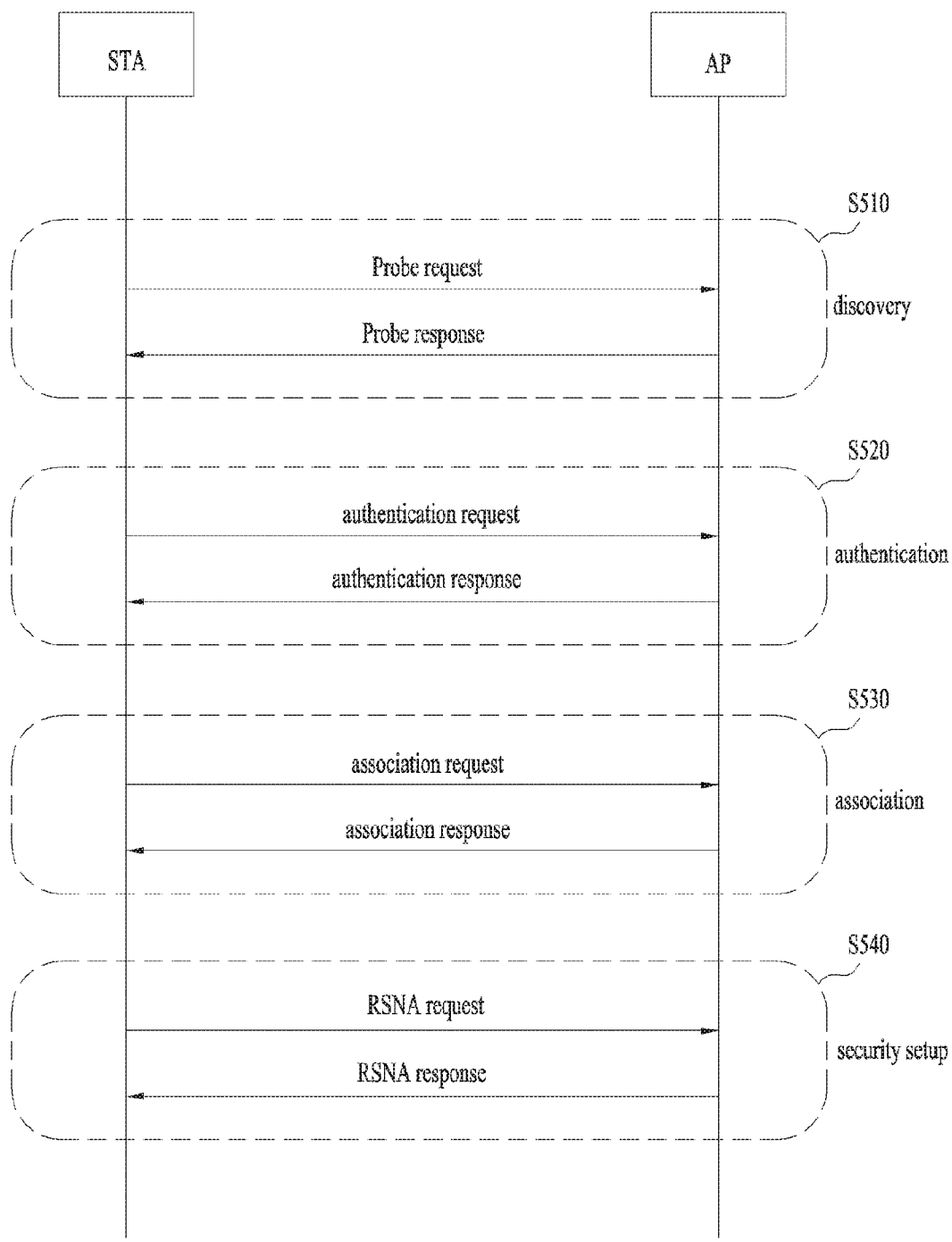
FIG. 4 illustrates a link setup procedure in a WLAN system.
Figure 5:
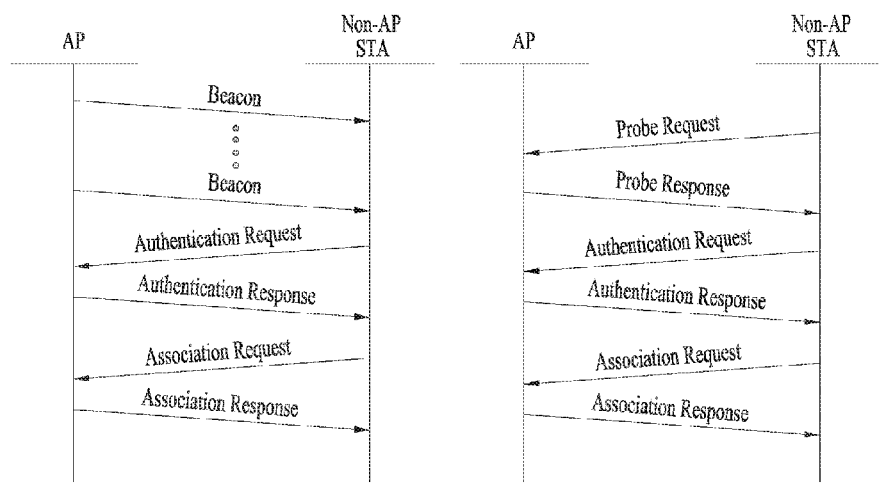
FIG. 5 is a diagram for explaining active scanning and passive scanning.

FIG. 4 is a view referred to for describing a general link setup procedure. FIG. 5 is a diagram for explaining active scanning and passive scanning.

In order to establish a link with a network and transmit and receive data to and from the network, an STA should discover, authenticate, associate with, and perform an authentication procedure for security with the network. The link setup procedure may be referred to as a session initiation procedure or a session setup procedure. Discovery, authentication, association, and security setup of the link setup procedure may be collectively called an association procedure.

An exemplary link setup procedure will be described below with reference to FIG. 4.

In step S510, an STA may discover a network. The network discovery may include the STA's scanning. That is, the STA should search for a joinable network to access the network. The STA needs to identify a compatible network before joining a wireless network. Identification of a network present in a specific area is referred to as scanning.

Scanning is categorized into active scanning and passive scanning.

FIG. 4 illustrates a network discovery operation including active scanning, by way of example. An STA performing active scanning transmits a probe request frame and awaits reception of a response to the transmitted probe request frame, while switching between channels, to determine which AP is present around the STA. A responder transmits a probe response frame in response to the probe request frame to the STA that has transmitted the probe request frame. Here, the responder may be an STA that has transmitted a last beacon frame in a BSS of the scanned channel. Since an AP transmits a beacon frame in a BSS, the AP is a responder. Since STAs sequentially transmit a beacon frame, a responder is not the same in an IBSS. For example, an STA, which has transmitted a probe request frame in channel #1 and has received a probe response frame in channel #1, stores BSS-related information included in the received probe response frame, and moves to the next channel (e.g. channel #2). In the same manner, the STA may perform scanning on the next channel (i.e. probe request/response transmission and reception in channel #2).

Referring to FIG. 5, the scanning may be passive scanning. An STA that performs passive scanning awaits reception of a beacon frame while moving from one channel to another. The beacon frame is one of management frames in IEEE 802.11. The beacon frame is periodically transmitted to announce the presence of a wireless network and allow a scanning STA to search for the wireless network and thus join the wireless network. In a BSS, an AP is configured to periodically transmit a beacon frame, whereas in an IBSS, STAs are configured to sequentially transmit a beacon frame. Upon receipt of a beacon frame, a scanning STA stores BSS-related information included in the beacon frame and moves to another channel. In this manner, the STA stores beacon frame information on each channel. Upon receipt of the beacon frame, the STA may store BSS-related information included in the received beacon frame, move to the next channel, and perform scanning on the next channel in the same manner.

Active scanning is more advantageous than passive scanning in terms of delay and power consumption.

After discovering the network, the STA may perform an authentication procedure in step S520. The authentication procedure may be referred to as a first authentication procedure to be distinguished from a security setup procedure performed in step S540.

The authentication procedure includes transmission of an authentication request frame to an AP by an STA and transmission of an authentication response frame to the STA by the AP in response to the authentication request frame. The authentication frame used for authentication request/response is a management frame.

The authentication frame may include information about an authentication algorithm number, an authentication transaction sequence number, a state code, challenge text, a Robust Security Network (RSN), a Finite Cyclic Group (FCG), etc. The above-mentioned information contained in the authentication frame is an exemplary part of information that may be included in the authentication request/response frame. The information may be replaced with other information or include additional information.

The STA may transmit the authentication request frame to the AP. The AP may determine whether to accept authentication of the STA based on the information included in the received authentication request frame. The AP may provide an authentication processing result to the STA in the authentication response frame.

After the STA is successfully authenticated, an association procedure may be performed in step S530. The association procedure includes transmission of an association request frame to the AP by the STA and transmission of an association response frame to the STA by the AP in response to the association request frame.

For example, the association request frame may include information related to various capabilities, a beacon listening interval, a Service Set Identifier (SSID), supported rates, supported channels, an RSN, a mobility domain, supported operating classes, a Traffic Indication Map (TIM) broadcast request, interworking service capability information, etc.

For example, the association response frame may include information associated with various capabilities, a status code, an Association Identification (AID), supported rates, an Enhanced Distributed Channel Access (EDCA) parameter set, a Received Channel Power Indicator (RCPI), a Received Signal to Noise Indicator (RSNI), a mobility domain, a timeout interval (association comeback time), an overlapping BSS scan parameter, a TIM broadcast response, a Quality of Service (QoS) map, etc.

The above-mentioned information is an exemplary part of information that may be included in the association request/response frame. The information may be replaced with other information or may include additional information.

After the STA is successfully associated with the network, a security setup procedure may be performed in step S540. The security setup process of step S540 may be referred to as an authentication procedure based on a Robust Security Network Association (RSNA) request/response. The authentication procedure of step S520 may be referred to as a first authentication procedure and the security setup procedure of step S540 may be referred to simply as an authentication procedure.

The security setup procedure of step S540 may include private key setup through 4-way handshaking, for example, by an Extensible Authentication Protocol over LAN (EAPOL) frame. In addition, the security setup procedure may be performed according to any other security scheme that is not defined in the IEEE 802.11 standard.

Figure 6:
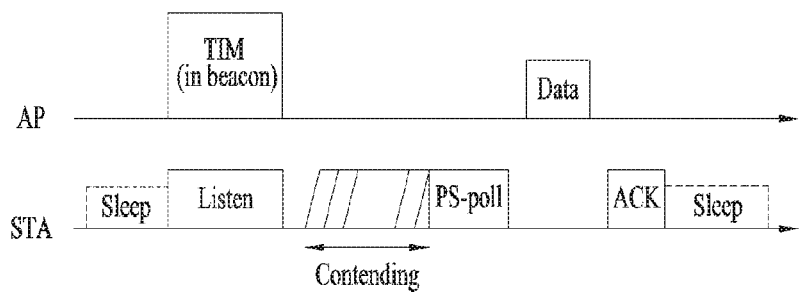
FIGS. 6, 7, and 8 illustrate operations of a Station (STA), when the STA receives a Traffic Indication Map (TIM)
Figure 7:
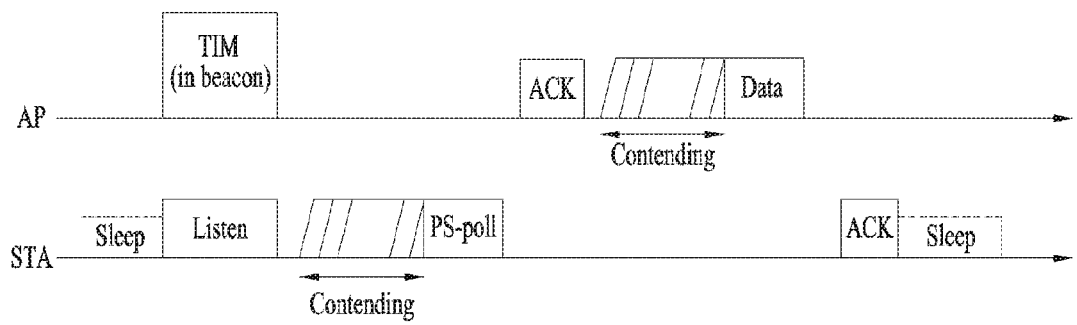
Figure 8:
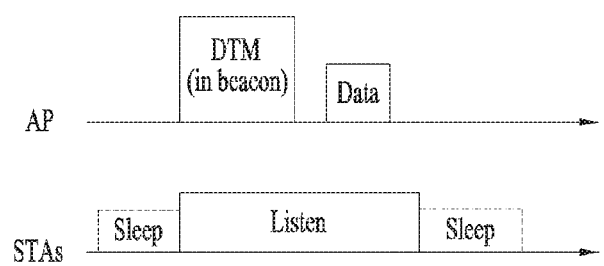
Figure 9:
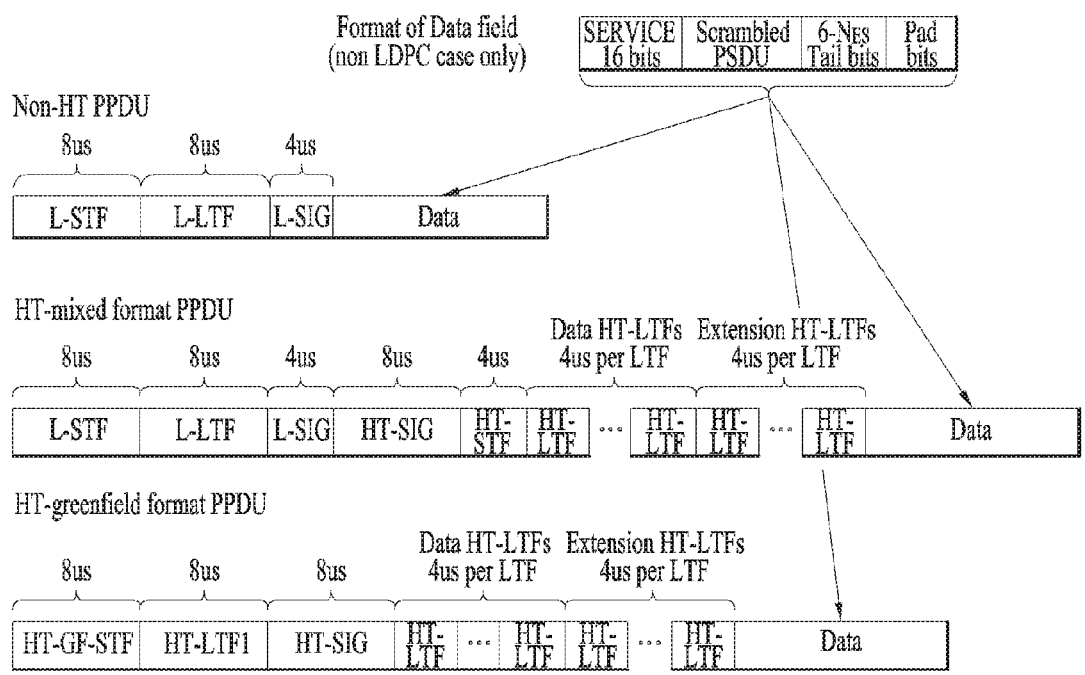

FIGS. 6, 7, and 8 illustrate operations of a Station (STA), when the STA receives a Traffic Indication Map (TIM).

Referring to FIG. 6, an STA may transition from a sleep state to an awake state to receive a beacon frame including a TIM from an Access Point (AP), and may be aware that there is buffered traffic directed to it by interpreting the received TIM element. After the STA contends with other STAs to access a medium for transmission of a Power Save Poll (PS-Poll) frame, the STA may transmit a PS-Poll frame to the AP in order to request data frame transmission. Upon receipt of the PS-Poll frame from the STA, the AP may transmit a data frame to the STA. The STA may receive the data frame and transmit an Acknowledgement (ACK) frame to the AP in response to the data frame. Then, the STA may return to the sleep state.

As illustrated in FIG. 6, the AP may operate in an immediate response scheme in which it transmits the data frame a predetermined time (e.g., a Short Inter-Frame Space (SIFS)) after receiving the PS-Poll frame from the STA. On the other hand, if the AP has not prepared the data frame to be transmitted to the STA during the SIFS after receiving the PS-Poll frame, the AP may operate in a deferred response scheme, which will be described with reference to FIG. 7.

In the example of FIG. 7, the STA may transition from the sleep state to the awake state, receive a TIM from the AP, and transmit a PS-Poll frame to the AP after contention, in the same manner as in the example of FIG. 6. If the AP has not prepared a data frame during an SIFS despite reception of the PS-Poll frame, the AP may transmit an ACK frame to the STA instead of the data frame. When the AP prepares the data frame after transmitting the ACK frame, the AP may transmit the data frame to the STA after contention. The STA may transmit an ACK frame indicating successful reception of the data frame to the AP and transition to the sleep state.

FIG. 8 illustrates an example in which an AP transmits a Delivery Traffic Indication MAP (DTIM). STAs may transition from the sleep state to the awake state to receive a beacon frame including a DTIM element. The STAs may be aware that the AP will transmit a multicast/broadcast frame by the received DTIM. After transmitting the beacon frame including the DTIM, the AP may transmit data (i.e., the multicast/broadcast frame) immediately without transmitting/receiving a PS-Poll frame. After receiving the beacon frame including the DTIM, the STAs may receive the data, maintaining the awake state. When the data reception is completed, the STAs may return to the sleep state.

FIGS. 9 to 13 illustrate exemplary frame structures used in an Institute of Electrical and Electronics Engineers (IEEE) 802.11 system.

An STA may receive a PLCP Protocol Data Unit (PPDU). A PPDU frame may be formatted to include a Short Training Field (STF), a Long Training Field (LTF), a SIGNAL (SIG) field, and a Data field. For example, a PPDU frame format may be configured based on the type of the PPDU frame format.

For example, a non-High Throughput (non-HT) PPDU format may include only a Legacy-STF (L-STF), a Legacy-LTF (L-LTF), a SIG field, and a Data field.

The PPDU frame format type may be configured to be one of a HT-mixed format PPDU and an HT-greenfield format PPDU. The above-described PPDU format may further include an additional STF (or an STF of a different type), an additional LTF (or an LTF of a different type), and an additional SIG field (or a SIG field of a different type) between the SIG field and the Data field.

Figure 10:
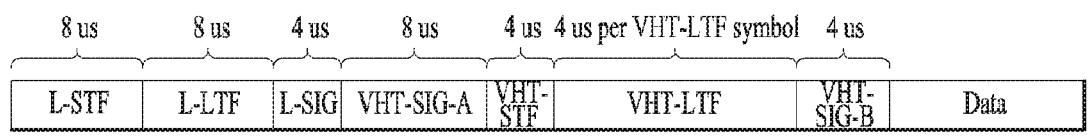

Referring to FIG. 10, a Very High Throughput (VHT) PPDU format may be configured. The VHT PPDU format may also include an additional STF (or an STF of a different type), an additional LTF (or an LTF of a different type), and an additional SIG field (or a SIG field of a different type) between the SIG field and the Data field. More specifically, at least one of a VHT-SIG-A field, a VHT-STF, a VHT-LTF, and a VHT SIG-B field may further be included between an L-SIG field and the Data field in the VHT PPDU format.

An STF may be a signal used for Automatic Gain Control (AGC), diversity selection, accurate time synchronization, etc. The STF and the LTF may be collectively referred to as a Physical Layer Convergence Protocol (PLCP) preamble, and the PLCP preamble may be a signal used for synchronization and channel estimation of an OFDM physical layer.

Figure 11:
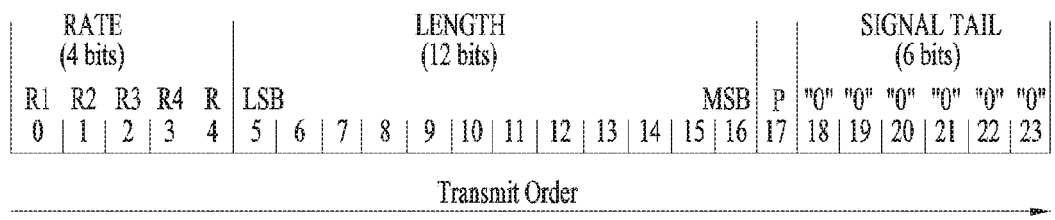

Referring to FIG. 11, the SIG field may include a RATE field and a LENGTH field. The RATE field may include information about modulation and a coding rate of data. The LENGTH field may include information about the length of the data. Additionally, the SIG field may include parity bits, and SIG Tail bits.

The Data field may include a SERVICE field, a PLCP Service DATA Unit (PSDU), and PPDU TAIL bits. When needed, the Data field may also include padding bits.

Figure 12:
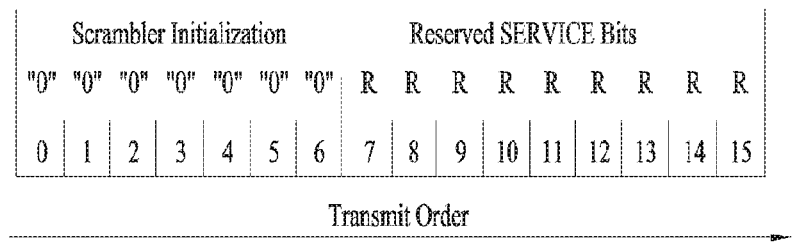

Referring to FIG. 12, a part of bits of the SERVICE field may be used for synchronization of a descrambler in a receiver, and another part of the bits of the SERVICE field may be reserved. The PSDU may correspond to a MAC Protocol Data Unit (PDU) defined at the MAC layer and include data generated/used by a higher layer. The PPDU TAIL bits may be used to return an encoder to a zero state. The padding bits may be used to match the length of the Data field to a predetermined unit.

As described before, for example, the VHT PPDU format may include an additional STF (or an STF of a different type), an additional LTF (or an LTF of a different type), and an additional SIG field (or a SIG field of a different type). The L-STF, the L-LTF, and the L-SIG may be a part for non-VHT in the VHT PPDU, and the VHT-SIG-A, the VHT-STF, the VHT-LTF, and the VHT-SIG-B may be a part for VHT. In other words, an area for non-VHT fields and an area for VHT fields may be separately defined in the VHT PPDU. For example, the VHT-SIG-A may include information for interpreting the VHT PPDU.

Referring to FIG. 13, for example, the VHT-SIG-A may include VHT SIG-A1 (FIG. 13(a)) and VHT SIG-A2 (FIG. 13(b)). Each of the VHT SIG-A1 and the VHT SIG-A2 may have 24 data bits, and the VHT-SIG A1 may precede the VHT-SIG A2. The VHT-SIG-A1 may include a Bandwidth (BW) field, a Space Time Block Coding (STBC) field, a Group Identifier (ID) field, a Number of Space-Time Streams (NSTS)/Partial Association ID (Partial AID) field, a TXOP_PS_NOT_ALLOWED field, and a Reserved field. The VHT SIG-A2 may include a Short Guard Interval (GI)

field, a Short GI NSYM Disambiguation field, a Single User (SU)/Multi-User (MU)[0] Coding field, a Low Density Parity Check (LDPC) Extra OFDM Symbol field, an SU VHT-Modulation Coding Scheme (MCS)/MU[1-3] Coding field, a Beamformed field, a Cyclic Redundancy Check (CRC), a Tail, and a Reserved field. Information about the VHT PPDU may be acquired from the VHT SIG-A1 and the VHT SIG-A2.

FIGS. 14, 15, and 16 illustrate a MAC frame format.

An STA may receive a PPDU configured in one of the foregoing PPDU formats. A PSDU of a data part in the PPDU frame format may include a MAC PDU. The MAC PDU may be defined in various MAC frame formats, and a basic MAC frame may include a MAC header, a frame body, and a Frame Check Sequence (FCS).

Referring to FIG. 14, for example, the MAC header may include a Frame Control field, a Duration/ID field, Address fields, a Sequence Control field, a Quality of Service (QoS) Control field, and a HT Control field. In the MAC header, the Frame Control field may include control information needed for frame transmission/reception. The Duration/ID field may be set to a duration over which a frame is transmitted. The Address fields may include identification information about a transmitter and a receiver, which will be described later. For the Sequence Control, QoS Control, and HT Control fields, refer to IEEE 802.11 standard specifications.

For example, two forms, HT variant and VHT variant are available to the HT Control field. Different information may be included in the HT Control field according to each form. Referring to FIGS. 15 and 16, a VHT subfield of the HT Control field may indicate whether the HT Control field is a HT variant or a VHT variant. For example, if the VHT subfield has a value of "0", the HT Control field may be a HT variant, and if the VHT subfield has a value of "1", the HT Control field may be a VHT variant.

Referring to FIG. 15, for example, if the HT Control field is a HT variant, the HT Control field may include Link Adaptation Control, Calibration Position, Calibration Sequence, Channel State Information (CSI)/Steering, HT Null Data Packet (NDP) Announcement, Access Category (AC) constraint, Reverse Direction Grant (RDG)/More PPDU, and Reserved fields. Referring to FIG. 15(b), for example, the Link Adaptation Control field may include Training Request (TRQ), MCS Request or Antenna Selection Indication (MAI), MFB Sequence Identifier (MFSI), and MCS Feedback (MFB)/Antenna Selection Communication (ASELC) fields. For more details, see IEEE 802.11 standard specifications.

Referring to FIG. 16, for example, if the HT Control field is a VHT variant, the HT Control field may include MRQ, MSI, MFSI/GID-LM, MFB GID-H, Coding Type, FB Tx Type, FB Tx Type, Unsolicited MFB, AC constraint, RDG/More PPDU, and Reserved fields. Referring to FIG. 16(b), for example, the MFB field may include VHT N_STS, MCS, BW, and SNR fields.

FIG. 17 illustrates a short MAC frame format. A MAC frame may be configured in the form of a short MAC frame to reduce unnecessary information under circumstances and thus save radio resources. Referring to FIG. 17, for example, a MAC header of a short frame may include a Frame Control field, an A1 field, and an A2 field which are mandatory. The MAC header of the short frame may further include a Sequence Control field, an A3 field, and an A4 field which are optional. Thus, the MAC frame does not include unnecessary information, thereby preventing waste of radio resources.

For example, the Frame Control field of the MAC header may include Protocol Version, Type, PTID/Subtype, From DS, More Fragment, Power Management, More Data, Protected Frame, End of Service Period, Relayed Frame, and Ack Policy fields. For details of each subfield of the Frame Control field, refer to IEEE 802.11 standard specifications.

Meanwhile, the Type field of the Frame Control field in the MAC header may be configured in 3 bits. Each of values 0 to 3 of the Type field may provide address information and values 4 to 7 of the Type field may be reserved. In this regard, the reserved values may be used to indicate new address information in the present invention, which will be described later.

The From DS field of the Control Frame field in the MAC header may be configured in 1 bit.

Each of other fields, that is, the More Fragment, Power Management, More Data, Protected Frame, End of Service Period, Relayed Frame, and Ack Policy fields may be configured in 1 bit. The Ack Policy field may provide ACK/NACK information in 1 bit.

Regarding STAs including the above-described frames, an AP VHT STA may support a non-AP VHT STA operating in Transmit Opportunity (TXOP) power save mode in one BSS. For example, the non-AP VHT STA may operate in the TXOP power save mode as an active state. The AP VHT STA may switch the non-AP VHT STA to a doze state during a TXOP. For example, the AP VHT STA may indicate switching to the doze state to the non-AP VHT STA by setting a TXVECTOR parameter, TXOP_PS_NOT_ALLOWED to 0 and transmitting a VHT PPDU with TXOP_PS_NOT_ALLOWED set to 0. Parameters in the TXVECTOR that the AP VHT STA transmits along with the VHT PPDU may be changed from 1 to 0 and maintained to be 0 during the TXOP. In this manner, power may be saved during the remaining TXOP.

On the contrary, if TXOP_PS_NOT_ALLOWED is set to 1 and power saving is not performed, the parameters in the TXVECTOR may be kept unchanged.

As described before, for example, the non-AP VHT STA may be switched to the doze state during a TXOP in the TXOP power save mode, if any of the following conditions is satisfied:

when the STA receives a VHT MU PPDU and is not indicated to be a member of a group identified by an RXVECTOR parameter, Group_ID;

when the STA receives an SU PPDU and an RXVECTOR parameter, PARTIAL_AID is not 0 or does not match the partial_AID of the STA;

when the STA determines that the RXVECTOR parameter, PARTIAL_AID matches the partial AID of the STA but a receiver address set in the MAC header does not match the MAC address of the STA;

when the STA is indicated to be a member of the group identified by the RXVECTOR parameter, Group_ID but an RXVECTOR parameter, NUM_STS is set to 0;

when the STA receives a VHT NDP Announcement frame, and the RXVECTOR parameter, PARTIAL_AID is set to 0 and does not match an AID set in the Info field of the STA; and when the STA receives a frame with a More Data field set to 0 and an Ack Policy subfield set to No Ack or transmits an ACK with an Ack Policy subfield set to a value other than No Ack.

Herein, the AP VHT STA may include a Duration/ID value set to a remaining TXOP period and a NAV-SET Sequence (e.g., RTS/CTS). The AP VHT STA may not transmit a frame to a non-AP VHT STA that transitions to the doze state, based on the above conditions during the remaining TXOP.

For example, if the AP VHT STA sets a TXVECTOR parameter, TXOP_PS_NOT_ALLOWED to 0 and transmits a VHT PPDU along with the TXVECTOR parameter, TXOP_PS_NOT_ALLOWED set to 0 during the same TXOP, and the STA does not want to switch from the active state to the doze state, the AP VHT STA may not transmit a VHT SU PPDU.

For example, the AP VHT STA may not transmit a frame to a VHT STA that has transitioned to the doze state, before expiration of a NAV which is set when a TXOP starts.

If the AP VHT STA transmits a frame including at least one of an MSDU, an A-MSDU, and an MMPDU with a More Data field set to 0 and fails to receive an ACK for the transmitted frame, the AP VHT STA may retransmit the frame at least once during the same TXOP. If the AP VHT STA fails to receive an ACK for the retransmission in the last frame of the same TXOP, the AP VHT STA may retransmit the frame after waiting for the next TXOP.

For example, the AP VHT STA may receive a BlockAck frame from a VHT STA operating in the TXOP power save mode. The BlockAck frame may be a response to an A-MPDU including an MPDU with a More Data field set to 0. Herein, the AP VHT STA is in the doze state and may not receive a response to a subsequence of a retransmitted MPDU during the same TXOP.

Further, a VHT STA that has operated in the TXOP power save mode and transitioned to the doze state may run a NAV timer during a doze-state operation. For example, upon expiration of the timer, the VHT STA may transition to the awake state.

In addition, upon expiration of the NAV timer, the STA may contend for medium access.

Now, a description will be given of a frame format in an IEEE 802.11ax system.

Figure 18:
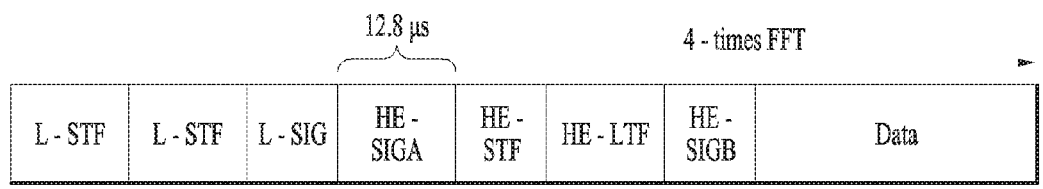
FIGS. 18 and 19 illustrate PLCP Protocol Data Unit (PPDU) formats in an IEEE 802.11ax system to which the present invention is applicable.
Figure 19:
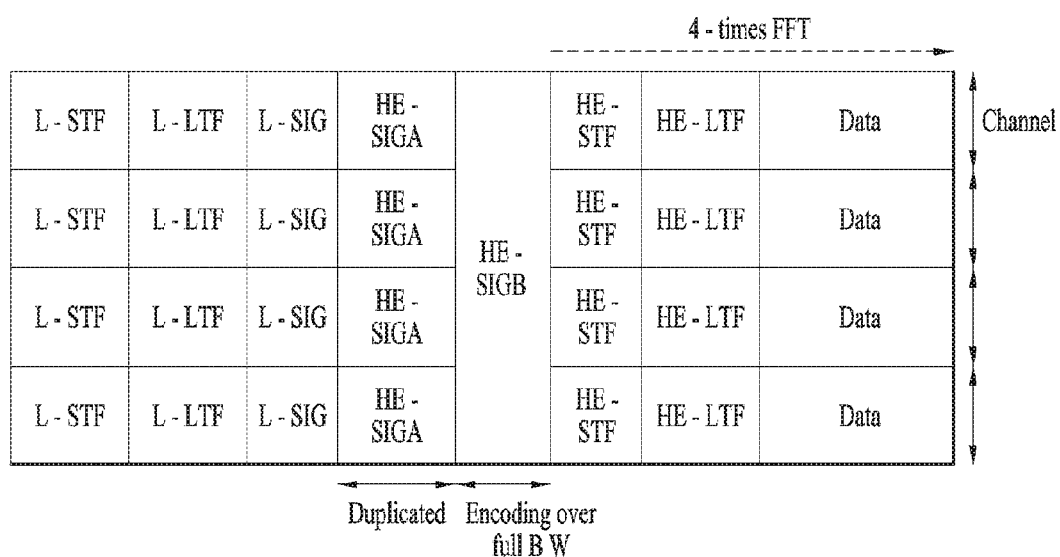

FIGS. 18 and 19 illustrate PPDU formats for an IEEE 802.11ax system to which the present invention is applicable.

As illustrated in FIG. 18, an IEEE 802.11ax PPDU may be divided into an L-part for legacy STAs and a HE-part for 11ax STAs. The L-part is used to prevent collision of legacy STAs, preferably based on a transmission scheme conforming to a legacy standard.

A HE-SIG A may carry common control information (e.g., a bandwidth, a GI, a length, and a BSS color field) for 11ax STAs, as a kind of control information for frame interpretation. A HE-part may have a 4-times FFT length, starting from a HE-STF. Meanwhile, a HE-SIG B field may be included, which carries control information (e.g., STA AID, resource allocation information (e.g., allocation size), MCS, Nsts, Coding, STBC, and TXBF) for each STA, when a PPDU is transmitted/received to/from a plurality of STAs. That is, a 11ax PPDU includes two separate signaling fields which may be referred to as a first signaling field and a second signaling field or HE-SIG A and HE-SIG B, respectively. Hereinbelow, the two separate signaling fields will be referred to as HE-SIG A and HE-SIG B, respectively, for the convenience of description.

Meanwhile, a Data field may follow a HE-preamble (HE-SIG A, HE-STF, HE-LTF, and HE-SIG B). Since the plurality of STAs may transmit or receive data in the Data field, the HE-SIG B preferably includes data transmission resource allocation information for the plurality of STAs.

FIG. 19 illustrates an exemplary transmission of a HE PPDU in an 80-MHz wide bandwidth. In FIG. 19, fields are arranged in a PPDU in a different order from in the PPDU illustrated in FIG. 18. In this manner, the order of arranging fields in a HE PPDU may vary.

If wideband transmission is performed as illustrated in FIG. 19, a HE-SIG A carrying common control information may be duplicated on a 20-MHz basis and transmitted, like the L-part. While a HE-SIG B carrying control information for each STA is shown as encoded over a full bandwidth and transmitted in the example of FIG. 19, the present invention is not limited thereto and, as described later, the HE-SIG B may be transmitted in various manners.

Hereinbelow, the structure of a HE-SIG B in the above-described frame structure will be focused.

Method for Transmitting HE-SIG B

Figure 20:
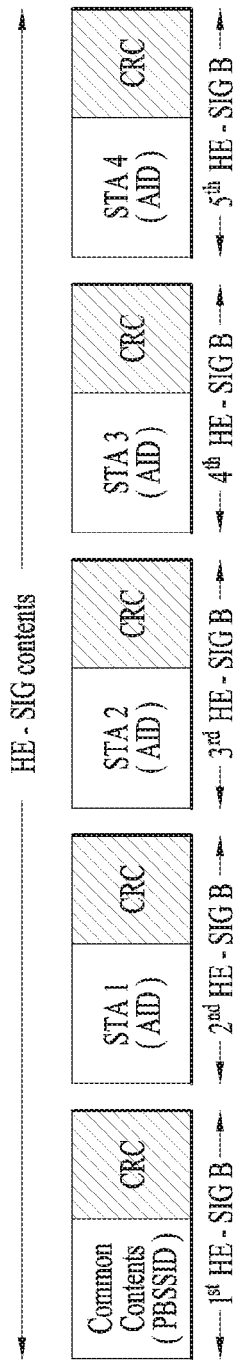
FIG. 20 illustrates a method for configuring and transmitting a High Efficiency Signal B (HE-SIG B) according to an embodiment of the present invention.

FIG. 20 illustrates a method for configuring and transmitting a HE-SIG B according to an embodiment of the present invention.

When a plurality of STAs receive a radio frame, each of the STAs performs blind detection to decode its contents in a HE-SIG B field. For example, the STA may determine whether contents is for the STA by masking a PAID of the STA with a CRC. Only if the number of blind detections of the STAs is minimized and each of the STAs efficiently detects a HE-SIG B including its contents, the processing overhead of the STAs may be reduced.

For this purpose, it is proposed in an embodiment of the present invention that HE-SIG B information is divided into a plurality of blocks in a specific 20-MHz band and the first of the blocks includes common control information readable by all STAs, as illustrated in FIG. 20. That is, one of the two signaling fields of a HE-preamble in a radio frame, HE-SIG A may include common control information for frame interpretation and the other signaling field, HE-SIG B may include control information for individual STAs, and the first of the blocks of the HE-SIG B may also carry common control information for the plurality of STAs so that each STA may efficiently decode the HE-SIG B.

While a first HE-SIG B block is configured with control information common to all STAs and the following plurality of blocks are configured with control information for the individual STAs separately in FIG. 20, the present invention is not limited thereto. The control information for each STA, following the common control block may be encoded on an STA group basis by grouping the STAs.

Also, each HE-SIG B block may include an individual CRC and the common control block may be identified by a common ID of the plurality of STAs, for example, a PBSSID or a Broadcast/Multicast ID (e.g., an ID with all bits set to 0s or 1s), instead of the AID of each STA.

The block including the above-described common control information preferably includes resource allocation information about the plurality of STAs. It is preferred that the resource allocation information indicates a resource unit configuration and the position of each resource unit commonly to all STAs, rather than the resource allocation information indicates an individual resource allocation position for each STA. The following per STA control information may indicate a resource allocation for each STA based on the resource allocation information. That is, the resource allocation information in the first block including common control information may include information about the number of resource units to be allocated, the size of each resource allocation unit, frequency-domain arrangement of each resource allocation unit, and the number of users allocated per resource allocation unit.

[Table 1] below illustrates an example of resource allocation information in a HE SIG field.

TABLE 1

| Name | Size in 20 MHz | Size in 40 MHz | Size (bits) in 80 MHz | Value & Notes |
|---|---|---|---|---|
| Null subband info | 3 | 3 | 3 | |
| OFDMA Resource Allocation information | | | | For 20, 40, 80 MHz Present only when OFDMA indication is 1 |
| STA's ID | 12 | 13 | 13 | When MU-MIMO indication is 1, LSB 6 bits of AID is set to GID |
| STBC | 1 | 1 | 1 | |
| Nsts | 3 | 3 | 3 | |
| MCS | 4 | 4 | 4 | |
| Coding | 1 | 1 | 1 | |

In [Table 1], Null subband info indicates a null subchannel across a full bandwidth. OFDMA resource allocation information indicates how OFDMA resources are allocated. For example, OFDMA resource allocation information specifies the number of 242-tone units, subbands to which the 242-tone units are allocated, and the number of 26-tone units allocated to each of the subbands. STA's ID indicates the PAID or Group ID of an STA. STA's ID is included repeatedly as many times as the number of OFDMA resource allocations. STBC/Nsts/MCS/Coding is included as many times as the number of allocated STAs.

Figure 21:
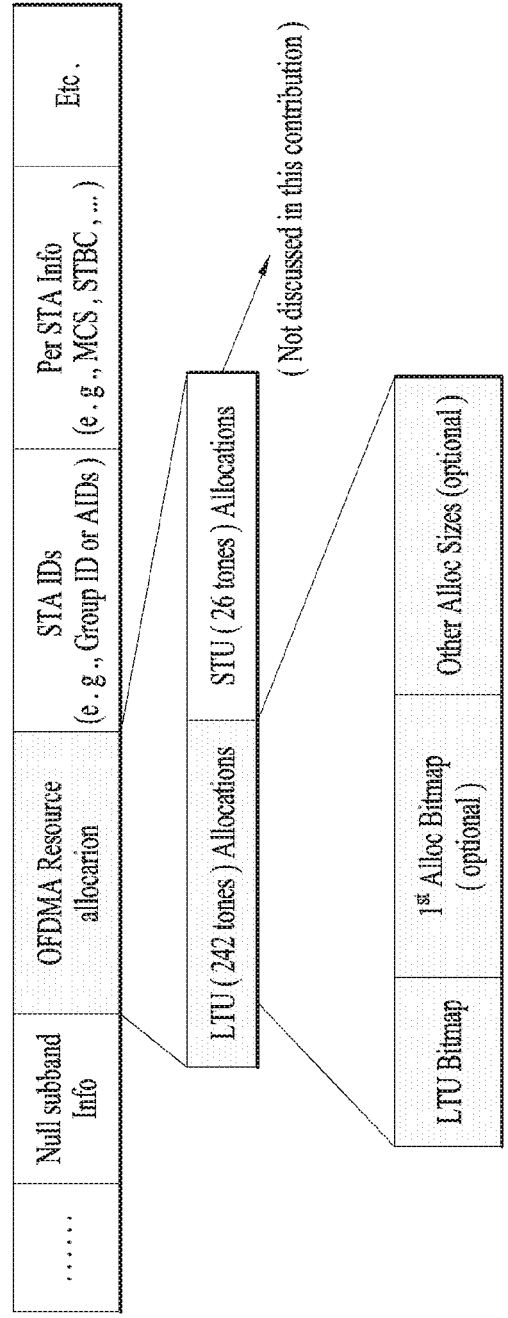
FIG. 21 illustrates a resource allocation structure according to an embodiment of the present invention.

FIG. 21 illustrates a resource allocation structure according to an embodiment of the present invention.

Referring to FIG. 21, OFDMA resource allocation information may be divided into Large Tone Unit (LTU) (242 tones unit) allocations information and Small Tone Unit (STU) (26 tone unit) allocations information. The LTU allocations may include an LTU Bitmap, a $1^{st}$ LTU Allocation Bitmap, and Other LTU Allocation Sizes. The LTU Bitmap may indicate whether each unit is allocated as a 242-tone unit or a 26-tone unit. The $1^{st}$ LTU Allocation Bitmap may indicate the allocation position and size of a $1^{st}$ LTU allocation. The Other LTU Allocation Sizes indicate the allocation positions and sizes of the remaining LTUs.

Based on the above description, common contents carried in a first HE-SIG B may include one or more of LTU (242 tones) Allocations information and STU Allocations information. Therefore, STAs may determine the number and positions of resource allocations by reading the first HE-SIG B. Additionally, the first HE-SIG B may include information about one or more of the total number of resource allocations, the number of LTU allocations, the number of STU allocations, the number of STU allocations per LTU/chunk, or the total number of users. Instead of the LTU/STU Allocations, this information may be included and transmitted.

All or part of the information included in the first HE-SIG B (e.g., LTU Allocations, STU Allocations, total allocation/LTU allocation/STU allocation/the number of STU allocations per LTU, and the number of user allocations, etc.) may be included and transmitted in a HE-SIG A. If part of the information is included and transmitted in the HE-SIG A, the LTU allocation information and the information about the numbers of allocations may be included and transmitted in the HE-SIG A, and the STU allocation information may be included and transmitted in the first HE-SIG B.

The size of the first HE-SIG B may be fixed or variable. If the size of the first HE-SIG B is variable, the size of the first HE-SIG B may be indicated by the HE-SIG A. The unit of the size may be set to one of n bits, n bytes, and n symbols (n: 1, 2, 4, or 8).

Now, a description will be given of a method for transmitting a HE-SIG B of a specific 20-MHz band over a wide band, which is configured as described above.

Figure 22:
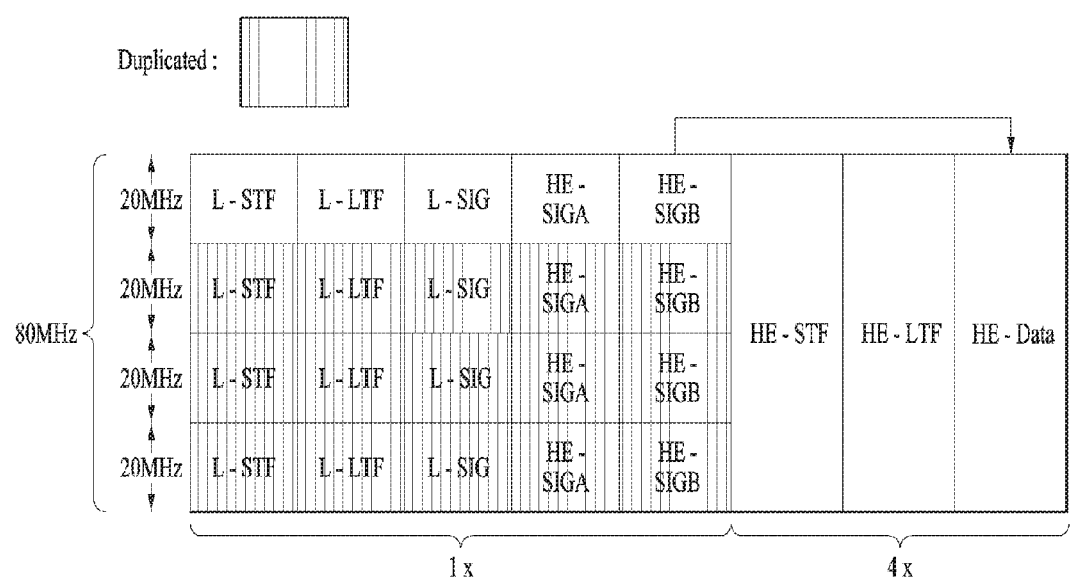
FIG. 22 illustrates transmission of duplicates of a HE-SIG B of a specific 20-MHz band in other bands according to an embodiment of the present invention.

FIG. 22 illustrates duplication of a HE-SIG B of a specific 20-MHz band and transmission of the HE-SIG B duplicates in other bands according to an embodiment of the present invention.

That is, the embodiment illustrated in FIG. 22 is based on the assumption that HE-SIG B information configured for a specific 20-MHz band is duplicated and transmitted in other 20-MHz bands, as described above.

As illustrated, upon receipt of duplicates of a HE-SIG B in respective 20-MH bands, an STA/AP may accumulate the HE-SIG B signals received on the respective channels, thus increasing the reliability of the received signal. Since the same signal is duplicated and transmitted on each channel, the gain of the accumulated signal is ideally 3 dB×(# of channels) according to the number of channels carrying the duplicated signals, compared to a signal before duplication. Thus, good reception performance may be ensured, compared to the legacy signal. Therefore, the duplicated HE-SIG Bs may be transmitted at an MCS level increased according to the number of duplicated channels. For example, if a HE-SIG B is transmitted using mcs0, a HE-SIG B for transmission in 40 MHz may be transmitted using an MCS level increased by one level, mcs1. The transmission of the HE-SIG B using a higher MCS level than a conventional HE-SIG B may lead to reduction of the overhead of the HE-SIG B.

Figure 23:
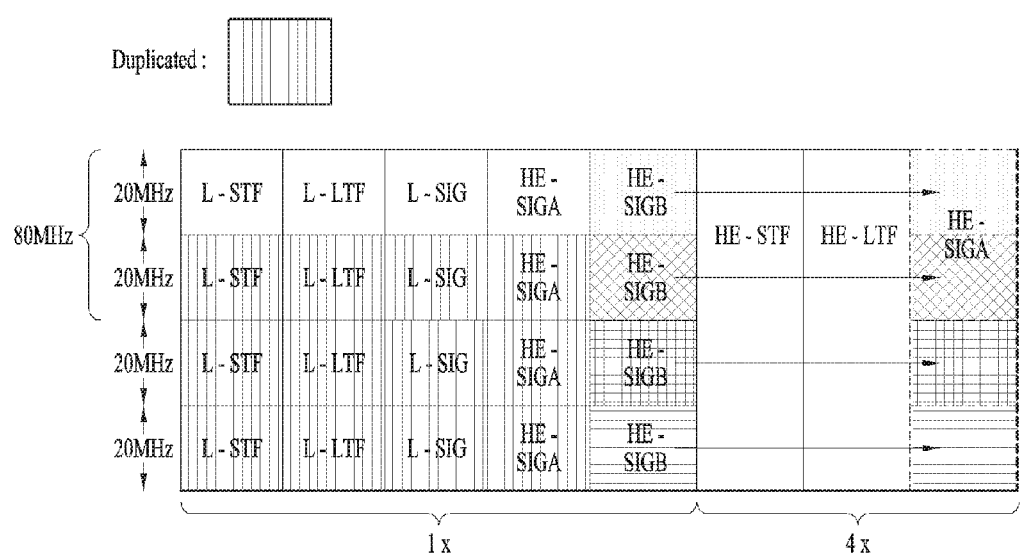
FIG. 23 illustrates configuration and transmission of an independent HE-SIG B in each 20-MHz band.

FIG. 23 illustrates configuration and transmission of an independent HE-SIG B in each 20-MHz band according to an embodiment of the present invention.

As illustrated in FIG. 23, a HE-SIG B is transmitted in a 1× symbol structure, like a legacy part (e.g., L-STF+L-LTF+L-SIG) and a HE-SIG A. The length of L-STF+L-LTF+L-SIG+HE-SIGA+HE-SIGB should be same irrespective of channels. However, a HE-SIG B transmitted per 20 MHz includes allocation information about a corresponding band and the allocation information includes allocation information for each of users using the band and the IDs of the users. Since the number of users supported in each band and the structure of a used resource block for each band are different, information about a HE-SIG B transmitted in each band may be different and thus the length of a HE-SIG B may be different in each band.

For this purpose, if a HE-SIG B in a specific band has a length different from a HE-SIG B in another band, the lengths of the HE-SIG Bs may be matched using a padding.

Figure 24:
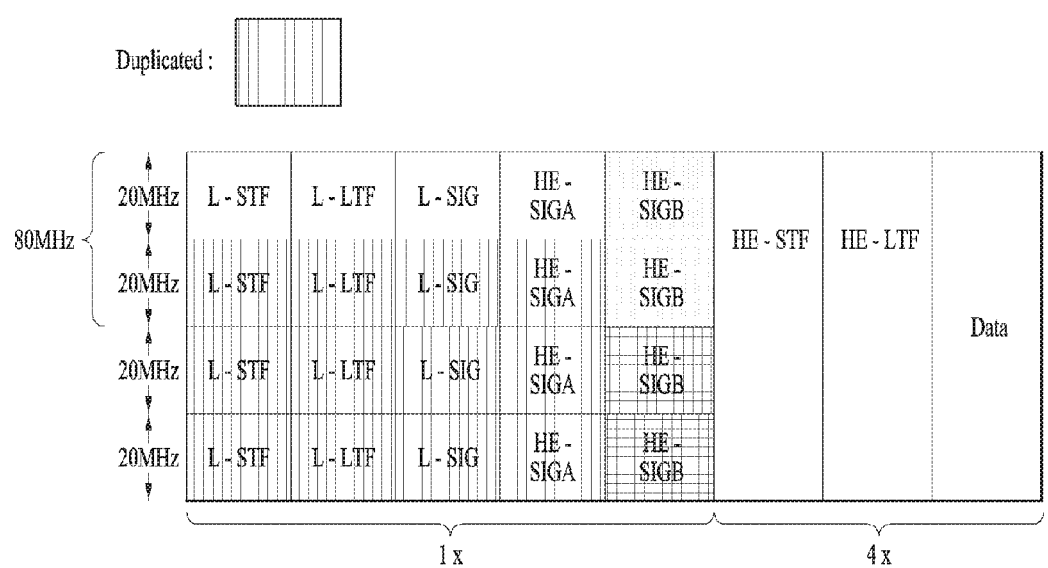
FIGS. 24 and 25 illustrate methods for transmitting a HE-SIG B in a wideband according to other embodiments of the present invention.
Figure 25:
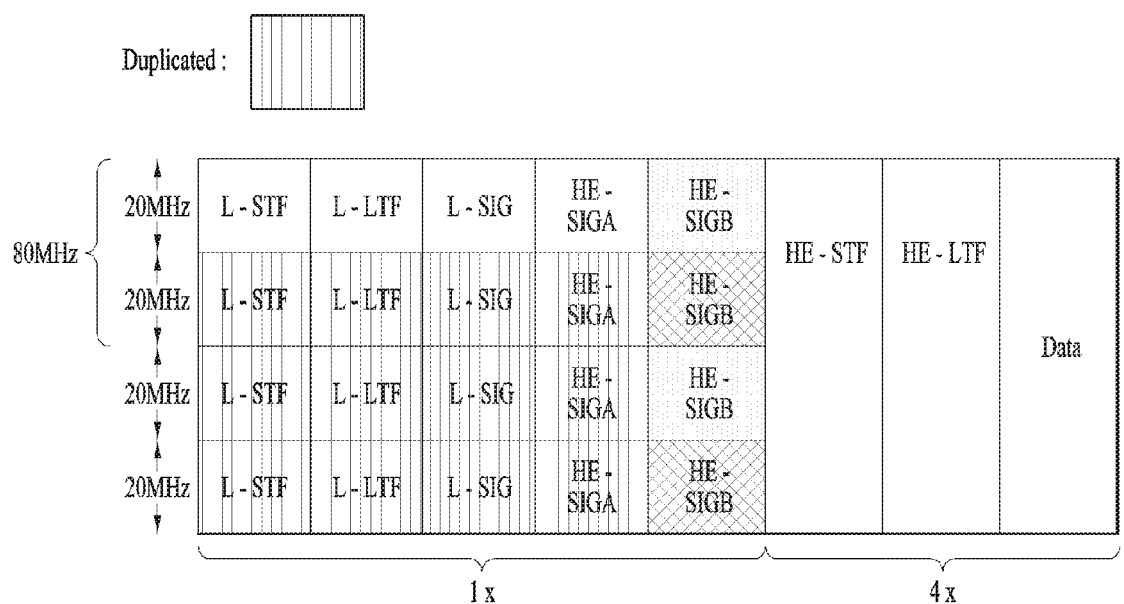

FIGS. 24 and 25 illustrate methods for transmitting a HE-SIG B in a wideband according to other embodiments of the present invention.

Specifically, the methods illustrated in FIGS. 24 and 25 are implemented by combining the duplicate transmission scheme of FIG. 22 with the individual transmission scheme of FIG. 23. FIG. 24 illustrates a case in which for 80-MHz transmission, an independent HE-SIG B for each 40 MHz is configured and transmitted, and a HE-SIG B of a specific 20-MHz band is duplicated and transmitted in another 20 MHz within each 40 MHz. On the other hand, FIG. 25 illustrates a scheme for transmitting independent control information on a 20-MHz basis within each 40 MHz and specific 40-MHz information is duplicated and transmitted in the other 40 MHz.

These combined methods may bring about the effect of combining the advantages and disadvantages of the afore-described duplicate transmission method and independent transmission method.

A detailed description will be given of a method for encoding HE-SIG B information in a specific band.

Figure 26:
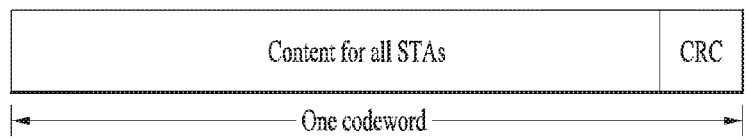
FIG. 26 illustrates a method for encoding a HE-SIG B for all STAs in a specific band as one unit according to an embodiment of the present invention.

FIG. 26 illustrates a method for encoding a HE-SIG B for all STAs in a specific band as one unit according to an embodiment of the present invention.

While HE-SIGB contents are encoded on an STA basis in FIG. 20, contents for a plurality of STAs are included in one HE-SIG B and jointly encoded in FIG. 26. If this joint encoding method is applied to the afore-described HE-SIG structure, the same jointly encoded HE-SIG contents may be duplicated in each 20 MHz and transmitted in the duplication per 20 MHz method of FIG. 22, and the jointly encoded HE-SIG contents may include different information about each STA in each 20 MHz and transmitted in the independent per 20 MHz method of FIG. 23.

Figure 27:
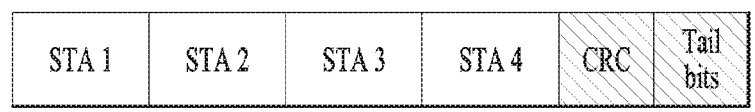
FIG. 27 illustrates the positions of a Cyclic Redundancy Check (CRC) and Tail bits in the case of encoding illustrated in FIG. 26.

FIG. 27 illustrates the positions of a CRC and Tail bits in the case of encoding illustrated in FIG. 26.

Figure 28:
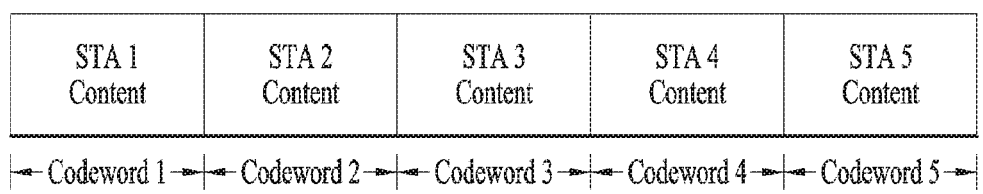
FIG. 28 illustrates a method for individually encoding HE-SIG B contents for each STA according to another embodiment of the present invention.

FIG. 28 illustrates a method for individually encoding HE-SIG B contents for each STA according to another embodiment of the present invention.

Different information may be intended for each STA and contents for each STA may be attached with a CRC, prior to transmission. Therefore, even though an error occurs to a HE-SIG B, contents for some STAs may be recovered.

This individual encoding method may be divided into the following two specific methods.

Figure 29:
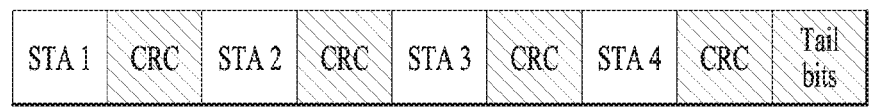
FIGS. 29 and 30 illustrate methods for configuring a CRC in an individual encoding scheme.
Figure 30:
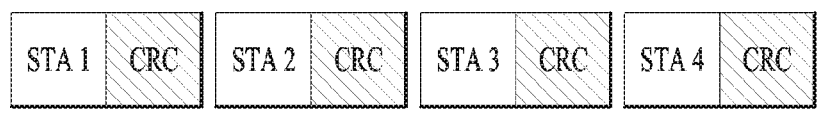

FIGS. 29 and 30 illustrate a method for configuring a CRC in an individual encoding scheme.

Specifically, a CRC is attached to contents separately on an STA basis and contents for STAs are jointly encoded in FIG. 29.

On the other hand, a CRC is attached to contents on an STA basis and contents for STAs are separately encoded in FIG. 30. To reduce the overhead of tail bits, tail biting coding may be performed separately.

To reduce CRC overhead in the individual encoding scheme, the PAID of an STA may be XOR-masked with a CRC, for transmission, and a receiver STA may perform a CRC check by XOR-operating the PAID with the CRC and determine the presence or absence of an error in the CRC.

Figure 31:
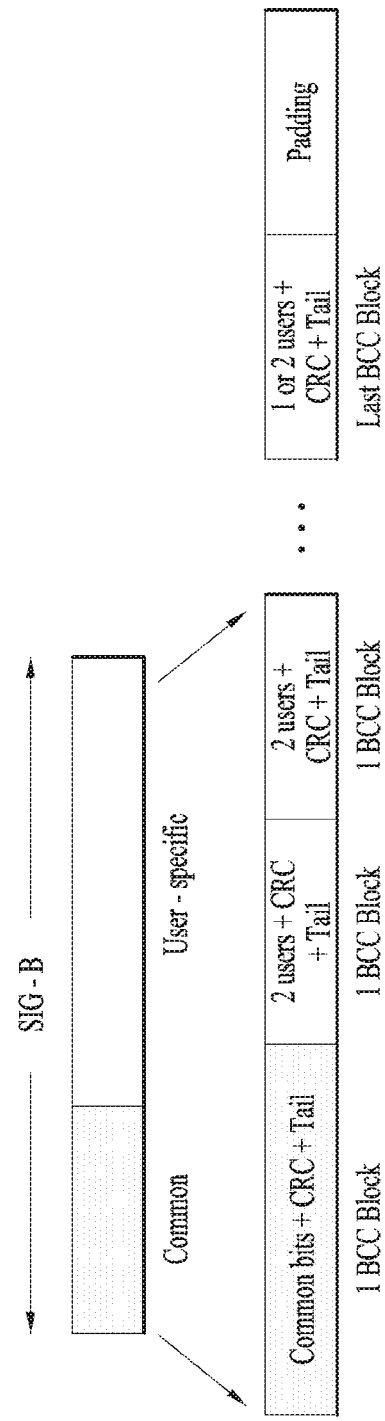
FIG. 31 illustrates a method for encoding a HE-SIG B in a specific band according to another embodiment of the present invention.

FIG. 31 illustrates a method for encoding a HE-SIG B in a specific band according to another embodiment of the present invention.

As described before with reference to FIG. 20, a HE-SIG B of a specific band is preferably divided into a block including common control information for all STAs and blocks including specific control information for individual STAs, and FIG. 31 also illustrates configuration of control information in the same manner.

In FIG. 31, however, each HE-SIG B block is a BCC encoding block. Particularly, control information for a predetermined number of STAs is grouped and BCC blocks are configured on the basis of control information for the grouped STAs, rather than control information for each block is separately configured into a BCC block.

FIG. 31 illustrates inclusion of a CRC and Tail bits in each BCC block. Further, if a HE-SIG B of a specific band has a different time-domain length from a HE-SIG B of another band, a padding is inserted to match the time-domain lengths.

Figure 32:
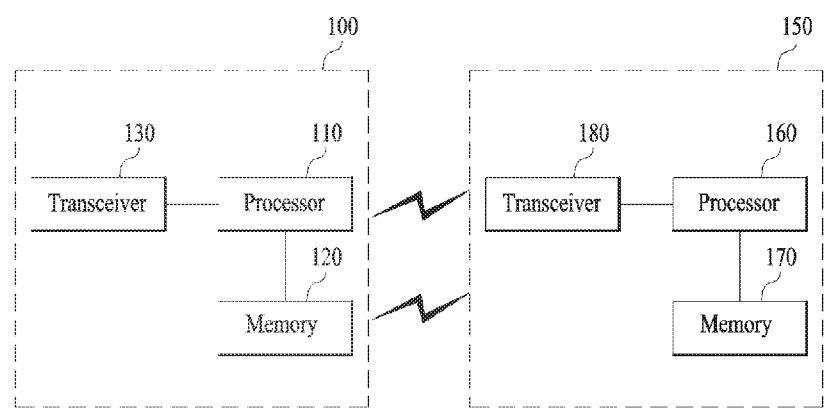
FIG. 32 is a block diagram of apparatuses for performing the above methods.

FIG. 32 is a block diagram of apparatuses for performing the above-described methods.

Referring to FIG. 32, a wireless apparatus 100 may be the afore-described specific STA, and a wireless apparatus 150 may be the afore-described AP.

The STA 100 may include a processor 110, a memory 120, and a transceiver 130. The AP 150 may include a processor 160, a memory 170, and a transceiver 180. The transceivers 130 and 180 may transmit and receive wireless signals and may be implemented in an IEEE 802.11/3GPP physical layer. The processors 110 and 160 may be implemented in the physical layer and/or the MAC layer and connected to the transceivers 130 and 180. The processors 110 and 160 may perform the forgoing UL MU scheduling procedure.

The processors 110 and 160 and/or the transceivers 130 and 180 may include Application-Specific Integrated Circuit (ASICs), other chip sets, logic circuits, and/or data processors. The memories 120 and 170 may include Read Only Memories (ROMs), Random Access Memories (RAMs), flash memories, memory cards, storage media, and/or other storage units. If an embodiment is implemented in software, the above-described methods may be performed in a module (e.g., a process or a function) performing the afore-described functions. The module may be stored in the memories 120 and 160 and executed by the processors 110 and 160. The memories 120 and 170 may reside inside or outside the processors 110 and 160 and may be connected to the processors 110 and 160 by well-known means.

As is apparent from the foregoing description, control information can be efficiently transmitted in a multi-user radio frame.

While the present invention has been described above in the context of an IEEE 802.11 WLAN system, the present invention is not limited thereto. The present invention is applicable in the same manner to various wireless systems in which an AP may transmit a frame including control information for a plurality of STAs.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

What is claimed is:

1. A method for transmitting a radio frame to a plurality of Stations (STAs) in a Wireless Local Area Network (WLAN) system, the method comprising:

generating a frame including a signaling field and a data field; and transmitting the generated frame to the plurality of STAs, wherein the signaling field includes a first signaling field (SIG A field) including control information for frame interpretation and a second signaling field (SIG B field) including control information individually for each of the plurality of STAs and common control information for the plurality of STAs, the second signaling field includes a first block including the common control information for the plurality of STAs, and a second block including the control information individually for each of the plurality of STAs, and wherein the second signaling field is transmitted repeatedly on a 40-MHz basis in an 80-MHz band, and the control information and the common control information of the second signaling field is encoded independently in each 20-MHz band of a specific 40 MHz band.

2. The method according to claim 1, wherein the second signaling field includes one first block and one or more second blocks following the first block, and the number of second blocks is determined according to the number of the plurality of STAs.

3. The method according to claim 1, wherein the first block includes resource allocation information for the plurality of STAs as the common control information for the plurality of STAs.

4. The method according to claim 3, wherein the resource allocation information includes at least one of information about the number of resource allocation units to be allocated, information about the size of each resource allocation unit, information about frequency-domain arrangement of each resource allocation unit, or information about the number of users allocated per resource allocation unit.

5. The method according to claim 1, wherein each of the first block and the second block of the second signaling field includes an individual Cyclic Redundancy Check (CRC).

6. The method according to claim 1, wherein the first signaling field includes information about a resource area in which the second signaling field is transmitted.

7. A wireless apparatus for transmitting a radio frame to a plurality of Stations (STAs) in a Wireless Local Area Network (WLAN) system, the wireless apparatus comprising:
a processor configured to generate a frame including a signaling field and a data field; and
a transceiver configured to transmit the generated frame to the plurality of STAs,
wherein the signaling field includes a first signaling field (SIG A field) including control information for frame interpretation and a second signaling field (SIG B field) including control information individually for each of the plurality of STAs and common control information for the plurality of STAs, the second signaling field includes a first block including the common control information for the plurality of STAs, and a second block including the control information individually for each of the plurality of STAs, and
wherein the second signaling field is transmitted repeatedly on a 40-MHz basis in an 80-MHz band, and the control information and the common control information of the second signaling field is encoded independently in each 20-MHz band of a specific 40 MHz band.

8. The wireless apparatus according to claim 7, wherein the second signaling field includes one first block and one or more second blocks following the first block, and the number of second blocks is determined according to the number of the plurality of STAs.

9. The wireless apparatus according to claim 7, wherein the first block includes resource allocation information for the plurality of STAs as the common control information for the plurality of STAs.

10. The wireless apparatus according to claim 9, wherein the resource allocation information includes at least one of information about the number of resource allocation units to be allocated, information about the size of each resource allocation unit, information about frequency-domain arrangement of each resource allocation unit, or information about the number of users allocated per resource allocation unit.

* * * * *